March 3, 1970     W. C. MITCHELL     3,498,538

VEHICLE BODY

Filed Oct. 6, 1967     2 Sheets-Sheet 1

INVENTOR.
William C. Mitchell
BY
Herbert Furman
ATTORNEY

United States Patent Office 3,498,538
Patented Mar. 3, 1970

3,498,538
VEHICLE BODY
William C. Mitchell, Cheshire, Conn., assignor to General Motors Corporation, Detroit, Mich., a corporation of Delaware
Filed Oct. 6, 1967, Ser. No. 673,324
Int. Cl. F01p 7/02
U.S. Cl. 236—35.3      8 Claims

ABSTRACT OF THE DISCLOSURE

A vehicle body includes a radiator and headlamps located in front of the radiator. The grille has an opening for the radiator and an opening for the headlamps which is opened and closed by a headlamp door. A pellet motor senses the coolant outlet temperature at the radiator and if the temperature is above a predetermined maximum, it actuates a relay valve which in turn controls a motor to open the headlamp door and increase the air flow through the radiator through the headlamp opening in the grille. The system is vacuum actuated and the sensor valve is in series with a manual valve which opens and closes the headlamp doors when the headlamps are turned on and off. If there is a loss of vacuum, the relay valve immediately actuates the motor to open the headlamp doors.

---

This invention relates to vehicle bodies and mor particularly to a coolant temperature actuated control for vehicle body headlamp doors.

One of the modern trends in vehicle body styling is the use of concealed headlamps. The headlamps are mounted on the body inwardly of openings in the grille, and power actuated doors are provided to close the openings. Often the headlamps are located in front of the radiator and when the headlamp doors are in closed position, the only opening to the radiator for ambient air flow is through a center opening in the grille which is located betwen the headlamp openings. Under certain operating conditions, the maximum volume of air that can pass through the center opening is insufficient to maintain the outlet temperature of the coolant in the radiator below a predetermined maximum.

The control of this invention includes a sensor which senses the outlet temperature of the coolant. If this temperature exceeds a predetermined maximum, the control automatically opens one or both headlamp doors so that the additional ambient air flow to the radiator reduces the temperature of the coolant below the predetermined maximum. Thereupon the headlamp door or doors are again automatically closed. The control of this invention thus obviates any engine problems which might arise by reason of the vehicle being driven with the coolant temperature exceeding the predetermined maximum.

In its preferred embodiment, a control includes a pressure fluid operated motor for each headlamp door and a relay valve for connecting each motor to the source of pressure fluid. If for any reason there is a loss of pressure fluid, the control automatically actuates each motor to open its respective headlamp door. A manual valve for opening the doors when the headlamps are turned on is also connected to the control so as to actuate the relay valve and open and close each door when the headlamp switch is turned on and off. Again, if there is a loss of pressure fluid for any reason, each headlamp door will automatically be opened. Thus the control is arranged so that the vehicle cannot be deprived of headlamps at any time nor can any engine problems arise by loss of the pressure fluid.

It is, therefore, the primary object of this invention to provide a control to automatically open and close vehicle body headlamp doors in response to coolant temperature.

Figure 1:
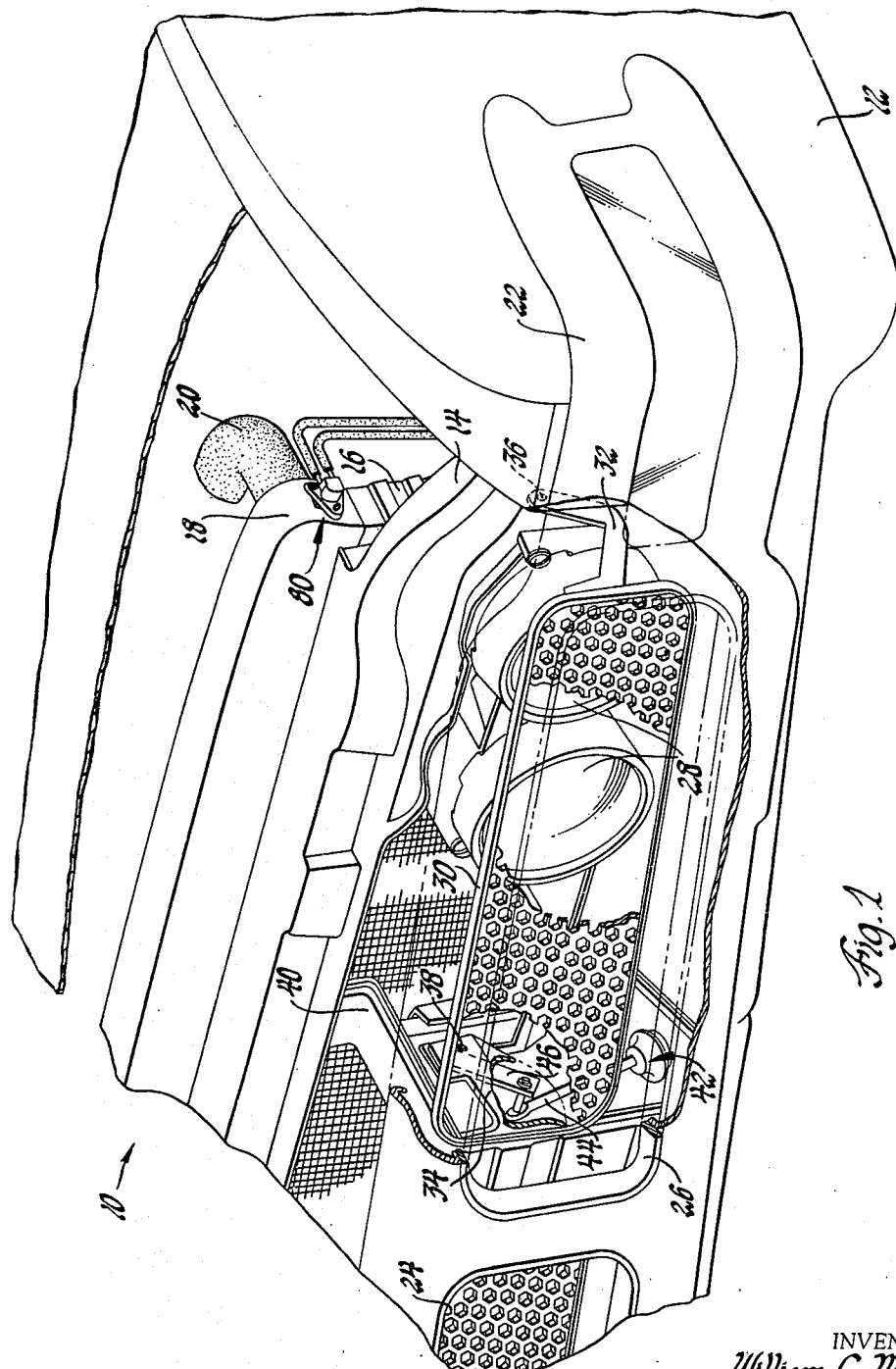
Figure 2:
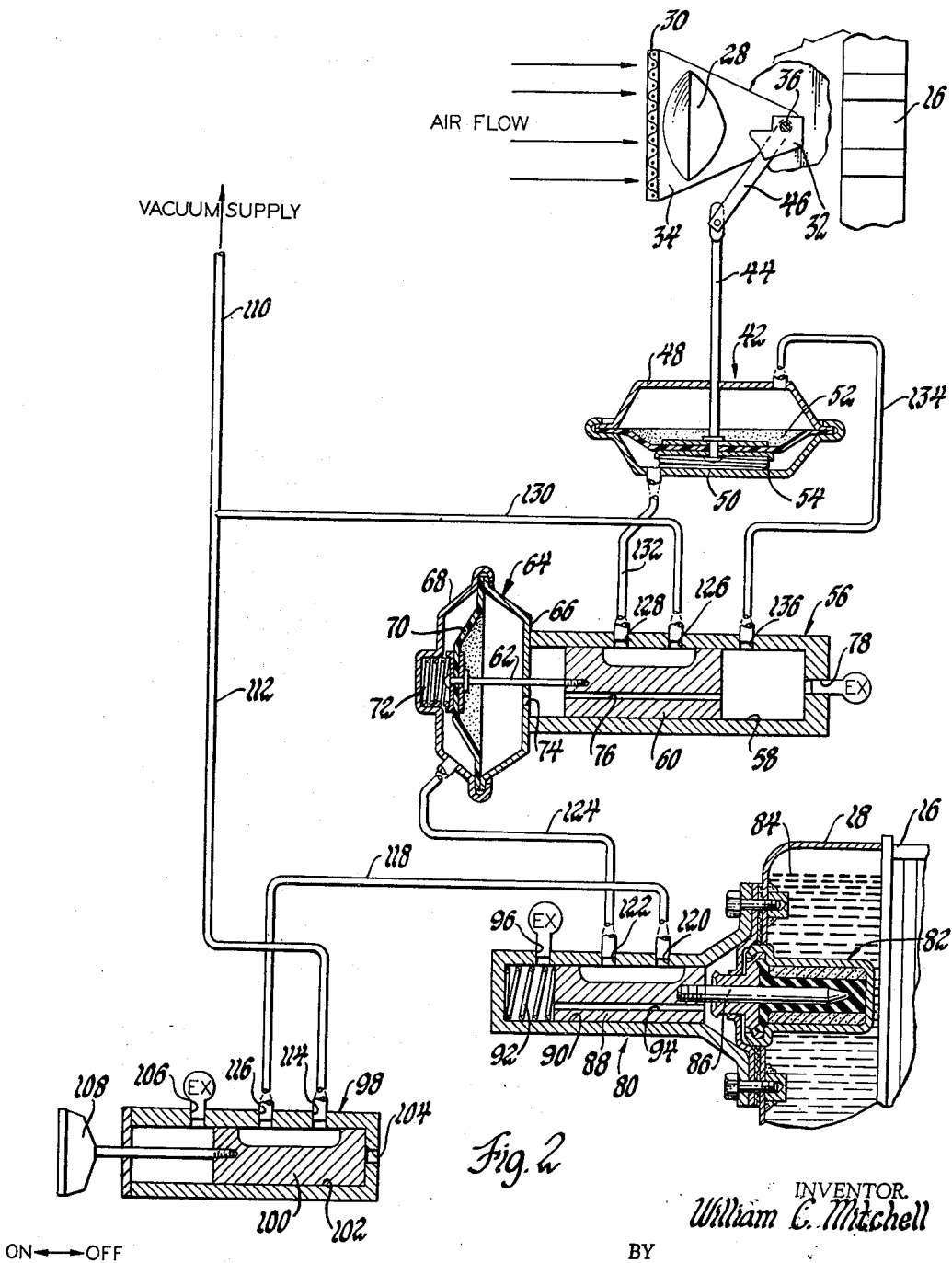

This and other objects of this invention will be readily apparent from the following specification and drawings wherein:

FIGURE 1 is a partially broken away partial perspective view of the front end of a vehicle body having a control according to this invention; and FIGURE 2 is a schematic view of the control.

The control may actuate either one or both of the headlamp doors. Therefore, while the following description is with reference to a vehicle body having the control acuate only one of the headlamp doors, it is believed obvious that it may actuate the other door if desired or required.

As shown in FIGURE 1, a vehicle body designated generally 10 includes a left-hand front fender 12 which is conventionally mounted on the body. Adjacent the front end of the fender 12, a radiator support structure designated generally 14 extends between and is secured to the fender 12 and the opposite fender, not shown, and to the chassis or frame of the vehicle. A conventional radiator 16 is supported by the support structure 14 and receives coolant from the engine block at an inlet tank, not shown, and then passes this coolant through the radiator where it is cooled and is then collected in an outlet tank designated 18. The coolant is thereupon returned to the engine block through the conduit 20.

A grille structure 22 extends across the front end of the vehicle and wraps around each of the fenders. This grille structure includes a center opening 24 which permits the passage of ambient air to the radiator, and an opening 26 to each side of the opening 24. A pair of headlamps 28 are mounted on the support structure 14 rearwardly of each opening 26 and in front of a portion of the radiator 16 so that they are in the path of ambient air flow through the opening 26 to the radiator.

A headlamp door 30 is swingably mounted on the body by arms 32 and 34 for movement between open and closed positions with respect to each opening 26. Arm 32 secured to the left-hand edge of the door 30 and pivoted at 36 on the fender 12 and arm 34 is secured to the right-hand edge of the door 30 and pivoted at 38 on a grille brace 40, which extends between the support structure 14 and the grille 22. The pivots 36 and 38 are on aligned axes so that the door 30 moves upwardly and rearwardly from closed position, as shown, to open position, not shown, to expose the headlamps 28 and the radiator 16 through the opening 26.

The door 30 is moved between its open and closed positions by a vacuum actuated motor 42 fixed to the body and having its piston rod 44 pivoted to an arm 46 which is fixed to the arm 34.

FIGURE 2 is a schematic view of the control for the headlamp door 30. This control actuates the motor 42 whenever the temperature of the coolant in the outlet tank 18 exceeds a predetermined maximum to move the door 30 to an open position so that ambient air may flow through the opening 26 to the radiator 16. As shown therein, the motor 42 includes upper and lower housings 48 and 50 which are hem flanged together and engage the edge portion of a diaphragm 52 therebetween. The piston rod 44 extends through an opening in the housing 48 and is secured to backing plates to either side of the diaphragm 52. A coil compression spring 54 seats between the housing 50 and the lower backing plate to normally bias the rod 44 upwardly and thereby bias the headlamp door 30 to open position.

A relay valve 56 includes a valve chamber 58 having a slide valve block 60 movable therein. The slide valve is secured to a rod 62 of a differential pressure operated motor 64 which is similar to the motor 42 and includes housings 66 and 68 which are hem flanged together and grip the edge portion of the diaphragm 70 therebetween. The piston rod 62 is secured to backing plates located to each side of the diaphragm and a coil compression spring 72 seats between the housing 68 and one of these plates to continually bias the valve block 60 to the right. An opening 74 in the housing 66 and a longitudinal passage 76 in the valve block continually vent the housing 66 and the chambers to each side of the valve block to atmosphere through a filtered exhaust port 78.

The sensor 80 generally comprises a conventional pellet motor 82 and reference may be had to Schwarz 3,092,322 for the specific details of the motor. The motor is shown with the temperature of the coolant 84 in the tank 18 below a predetermined maximum. The actuating rod 86 of the motor is connected to a slide valve block 88 mounted within a valve chamber 90 which is bolted with the motor 82 to the tank 18. A coil compression spring 92 seats between the valve block 88 and the closed end wall of chamber 90. The chamber 90 to each side of the valve block is further vented to atmosphere by means of a longitudinal passage 94 in the valve block and a filtered exhaust port 96.

The manual valve for the headlamp door 30 is designated 98 and includes a valve block 100 slidably mounted within a valve chamber 102. One side of the valve chamber is vented to atmosphere through a port 104 and the other side is vented to atmosphere through a filtered exhaust port 106. A manual knob 108 is connected to the valve block to move the valve block between its positions as will be described.

The control is shown in normal condition in FIGURE 2, with the headlamps 28 off and the temperature of the coolant 84 below a predetermined maximum.

In this condition, manifold vacuum from the manifold of the engine or an accumulator tank, not shown, passes through a conduit 110 to a conduit 112 which is connected to a port 114 in the valve chamber 102. The valve block 100 connects port 114 with a port 116 which is connected by a conduit 118 with a port 120 in the valve chamber 90. The valve block 88 connects port 120 with port 122 and a conduit 124 connects the latter port with the housing 68 so that vacuum is applied to the diaphragm 70. This locates the diaphragm as shown against the action of the spring 72 and positions the valve block 60 to connect ports 126 and 128. A conduit 130 connects the conduit 110 with port 126. A conduit 132 connects the port 128 with housing 50 to locate the diaphragm 52 as shown and thereby hold the door 30 in closed position against the action of spring 54. A conduit 134 connects the housing 48 with a port 136 in the chamber 56 which is vented to atmosphere through port 78. This vents the housing 48.

Assume now that the temperature of the coolant 84 rises above the predetermined maximum. The pellet motor 82 will shift the valve block 88 to the left against the action of the spring 92 so that the valve block connects the port 122 with the vent 96 and covers the port 120. This will apply atmospheric pressure to the housing 68 through the conduit 124 so that the diaphragm 70 will be shifted to the right to in turn shift the valve block 60 to the right so that it connects the ports 126 and 136. The port 128 will be vented to atmosphere through passage 76 and port 78 to vent the housing 50 to atmosphere.

Vacuum through the conduits 110 and 130 will be applied to the housing 48 through the conduit 134 to shift the diaphragm 52 upwardly and thereby shift the piston rod 44 upwardly with the aid of the spring 54 to swing the door 30 upwardly to open position. Thus, ambient air can pass through the opening 26 to the radiator 16. As soon as the increased ambient air flow through the radiator brings the coolant outlet temperature below the predetermined maximum, the pellet motor 82 returns the valve block 88 to its normal condition, as previously described, and the headlamp door will thereupon close.

The manual valve 98 may be operated concurrently with a standard headlamp switch or separately therefrom as desired. The manual valve provides a manual control for moving the door 30 to open position when it is desired to turn on the headlamps 28.

When the knob 108 is shifted to the left, the valve block 100 covers the port 114 and connects the ports 106 and 116. Atmospheric pressure is thereupon applied to the housing 68 through conduit 118, ports 120 and 122 and conduit 124. This will shift the diaphragm 70 to the right, with the aid of the spring 72, so that the valve block 60 connects the ports 126 and 136 to thereby apply vacuum to the housing 48 through the conduits 110, 130 and 134. The housing 50 is vented to atmosphere through conduit 132, passage 76 and port 78 and the diaphragm 52 will thereupon shift upwardly to shift rod 44 upwardly and move the headlamp door 30 to open position.

When the knob 108 is shifted to the right to its position as shown, the door 30 will close as previously described.

If there is a loss of vacuum in the conduit 110 for any reason, it is believed apparent that the relay valve 64 will immediately connect the ports 126 and 136 so that the motor 42 will immediately open the door 30. It is the application of vacuum to the chamber 68 through the manual valve 98 and the pellet motor 82 which maintains the relay valve in its position shown. As soon as there is any loss of vacuum, the relay valve will immediately shift to its other position. Likewise it is the application of vacuum to the chamber 50 which holds the door 30 in closed position. As soon as this vacuum is lost, spring 54 will immediately open door 30. Thus the control of this invention is arranged so that loss of pressure fluid cannot deprive the vehicle of headlamps nor can any engine problems arise due to the temperature of the coolant exceeding the predetermined maximum.

It can thus be seen that the control of this invention will automatically move the headlamp door to an open position to increase the ambient air flow to the radiator whenever the coolant outlet temperature exceeds a predetermined maximum. When the temperature is reduced below the predetermined maximum, the control automatically returns the door to its closed position.

Thus, this invention provides an improved coolant actuated control for vehicle body headlamp doors.

I claim:

1. The combination comprising, a vehicle body having a radiator for passing coolant therethrough in exchange relationship for ambient air flow, at least one headlamp located in the path of the ambient air flow to the radiator, body structure located in the path of the ambient air flow and having an opening therethrough to the headlamp and to the radiator, a door mounted on the body for movement between open and closed positions with respect to the opening, operating means for moving the door between open and closed closed positions, sensor means measuring the temperature of the coolant passing through the radiator, and control means actuated by the sensor means for controlling the operating means to move the door to open position when the coolant temperature exceeds a predetermined maximum.

2. The combination comprising, a vehicle body having a radiator for passing coolant therethrough in heat exchange relationship to ambient air flow, at least one headlamp located in the path of the ambient air flow to the radiator, body structure located in the path of the ambient air flow and having an opening therethrough to the headlamp and the radiator, a door mounted on the body for movement between open and closed positions with respect to the opening, a source of pressure fluid, differential fluid pressure operated motor means operatively connected to the door for moving the door between open and closed positions, valve means controlling the application of differential pressure fluid to the motor means, sensor means measuring the temperature of the coolant passing through the radiator, and means controlled by the sensor means for actuating the valve means to apply differential pressure fluid to the motor means and move the door to open position when the coolant temperature exceeds a predetermined maximum.

3. The combination recited in claim 2 including manually controlled means for controlling the valve means to apply differential pressure fluid to the motor means to move the door to open position.

4. The combination recited in claim 2 wherein the control means actuate the valve means to apply differential pressure fluid to the motor means to move the door to closed position when the coolant temperature is below the predetermined maximum.

5. The combination recited in claim 1 wherein the control means are actuated by the sensor means to control the operating means and move the door to closed position when the coolant temperature is below the predetermined maximum.

6. The combination recited in claim 2 wherein the control means include a differential pressure fluid operated motor controlled by the sensor means.

7. The combination recited in claim 2 wherein the sensor means include valve means connected to the source, and the control means includes a differential pressure fluid operated motor controlled by the sensor valve means.

8. The combination comprising, a vehicle body having a radiator for passing coolant therethrough in heat exchange relationship to ambient air flow, at least one headlamp located in the path of the ambient air flow to the radiator, body structure located in the path of the ambient air flow and having an opening therethrough to the headlamp and to the radiator, a door mounted on the body for movement between open and closed positions with respect to the opening, a source of pressure fluid, a differential pressure fluid operated motor operatively connected to the door for moving the door between open and closed positions, a valve connected between the source and the motor for energizing the motor by applying differential fluid pressure thereto, a second differential fluid pressure operated motor for controlling the valve, a sensor measuring the temperature of the coolant passing through the radiator, and a valve controlled by the sensor and connected between the source and the second motor for energizing the second motor, the sensor normally controlling the second valve to energize the second motor to control the first valve and energize the first motor to locate the door in closed position when the temperature of the coolant is below a predetermined maximum.

References Cited

UNITED STATES PATENTS

| | | | |
|---|---|---|---|
| 812,982 | 2/1906 | Davenport | 240—46.23 |
| 1,572,623 | 2/1926 | Staley | 240—46.23 |
| 1,481,307 | 1/1924 | Stuart | 236—35.3 |
| 2,018,724 | 10/1935 | Illstey | 236—35.3 |
| 3,373,934 | 1/1967 | Kolbe et al. | 236—87 X |

EDWARD J. MICHAEL, Primary Examiner

U.S. Cl. X.R.

236—82, 86; 240—46.23

PO-1050
(5/69)

UNITED STATES PATENT OFFICE
CERTIFICATE OF CORRECTION

Patent No. __3,498,538__  Dated __March 3, 1970__

Inventor(s) __William C. Mitchell__

It is certified that error appears in the above-identified patent and that said Letters Patent are hereby corrected as shown below:

Column 1, line 30, "mor" should read -- more --; line 41, "betwen" should read -- between --. Column 2, line 14, "acuate" should read -- actuate --. Column 4, line 51, after "in" insert -- heat --; line 52, "for" should read -- to --; line 71, after "and" insert --to --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents